(12) United States Patent
Saito

(10) Patent No.: US 7,197,081 B2
(45) Date of Patent: Mar. 27, 2007

(54) SYSTEM AND METHOD FOR RECEIVING OFDM SIGNAL

(75) Inventor: Toshitada Saito, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1371 days.

(21) Appl. No.: 10/029,037

(22) Filed: Dec. 28, 2001

(65) Prior Publication Data
US 2003/0081689 A1    May 1, 2003

(30) Foreign Application Priority Data
Oct. 22, 2001    (JP)    ............... 2001-322985

(51) Int. Cl.
*H04L 27/28* (2006.01)

(52) U.S. Cl. ............ 375/260; 375/340; 375/355; 370/203; 370/330; 370/480

(58) Field of Classification Search ............ 375/260, 375/261, 316, 335, 340, 355; 370/203, 330, 370/343, 464, 465, 480
See application file for complete search history.

(56) References Cited

U.S. PATENT DOCUMENTS 6,512,798 B1 * 1/2003 Akiyama et al. ........... 375/261
6,711,221 B1 * 3/2004 Belotserkovsky et al. .. 375/355

FOREIGN PATENT DOCUMENTS

| GB | 2 344 729 A | 6/2000 |
|---|---|---|
| JP | 4-72905 | 3/1992 |
| JP | 2001-24619 | 1/2001 |
| JP | 3183659 | 4/2001 |

* cited by examiner

*Primary Examiner*—Dac V. Ha
(74) *Attorney, Agent, or Firm*—Finnegan, Henderson, Farabow, Garrett & Dunner, L.L.P.

(57) ABSTRACT

A system for receiving an OFDM signal. An AD converter samples a received signal at a first sampling rate. A low pass filter removes noise from a signal outputted from the AD converter. A rate converter extracts data from a signal outputted from the low pass filter at a second sampling rate. An OFDM signal decoding circuit converts and decodes a signal outputted from the rate converter from a time domain to a frequency domain. An error correction circuit corrects errors of a signal outputted from the OFDM signal decoding circuit. The low pass filter varies its frequency characteristic in response to said first sampling rate.

23 Claims, 4 Drawing Sheets

SYSTEM AND METHOD FOR RECEIVING OFDM SIGNAL

CROSS REFERENCE TO RELATED APPLICATION

This application claims the benefit of priority from prior Japanese Patent Application No. 2001-322985, filed on Oct. 22, 2001; the entire contents of which are incorporated herein by reference.

BACKGROUND OF THE INVENTION

A wireless LAN (local area network) in the 5 GHZ band is premised on the use of an OFDM (orthogonal frequency division multiplexing) modulation system. The OFDM modulation system processes received signals as described below. A received OFDM signal is sampled as a digital signal (data) in an AD converter. In the sampled data, a frequency component of a channel adjacent to the data is removed in a low pass filter by digital signal processing. Then, the data is subjected to extraction processing at a required sampling rate in a rate converter. The data subjected to extraction processing is subjected to Fourier conversion in an OFDM signal decoding circuit. Then, errors of the data converted in a Viterbi decoder is corrected, and thus the received OFDM signal is decoded.

In the OFDM modulation system, since the signal of the adjacent channel is removed in a digital filter (low pass filter), data of a broader band than an effective frequency bandwidth must be sampled (oversampled), and data at a high sampling rate is required.

Moreover, since the OFDM signal is obtained by superimposing a plurality of subcarrier signals, a ratio of the maximum amplitude and an average amplitude of the signal are increased in comparison with those of a phase shift keying (PSK) signal and a frequency shift keying (FSK) signal. Hence, sampling data to a base band LSI for executing receiving processing by use of the OFDM signal must have a large number of bits.

As described above, in the system for receiving an OFDM signal, for which a digital signal processing technology is used, a multi-bit and high-rate (high sampling rate) AD converter is required. However, since power consumption is increased in such an AD converter, this AD converter is not suitable for a mobile communication apparatus.

Moreover, in the OFDM modulation system used for the wireless LAN, a transmission rate of the data is selected in accordance with a condition of a transmission path, and accordingly, a modulation system of the subcarrier is changed. Therefore, in the receiving processing, the sampling rate and the number of sampling bits, which are required, are changed in some steps in response to the modulation system of the received OFDM signal.

For example, in the case of a data transmission rate of 54 Mbps, a 64 QAM (quadrature amplitude modulation) modulation system is adopted. However, accompanied with lowering the data transmission rate, the modulation system is changed to a 16 QAM and QPSK (quadrature phase shift keying), and in the case of the lowest data transmission rate of 6 Mbps, the modulation system becomes a BPSK (binary phase shift keying) modulation system. In the case of the BPSK modulation system, about 8 bits are conceived to be sufficient for data in the AD converter and after. Moreover, also in decision in the Viterbi decoder, even if the number of bits for soft decision is reduced, or even by 1-bit hard decision, it is conceived to be possible that a sufficient performance is obtained.

However, heretofore, a circuit has been designed and implemented in accordance with a specification in the case where the sampling rate and the number of sampling bits are the maximum. Hitherto, facilitation of the design and the implementation has been given priority, and a circuit suitable for the case of 54 Mbps where the data transmission rate is the maximums been employed. For example, the specification has been set such as; 12-bit/40 MSPS in the AD converter; 12-bit/20 MSPS in an FFT (fast Fourier transform); and 6-bit soft decision in the Viterbi decoder.

Therefore, even if the data transmission rate is lowered to change the modulation system, the power consumed in the AD converter or the circuit that executes the digital signal processing has not been able to be reduced.

SUMMARY OF THE INVENTION

An embodiment of the present invention is a system for receiving an OFDM signal.

An AD converter samples a received signal at a first sampling rate. A low pass filter removes noise from a signal outputted from said AD converter. A rate converter extracts data from a signal outputted from said low pass filter at a second sampling rate. An OFDM signal decoding circuit converts and decodes a signal outputted from said rate converter from a time domain to a frequency domain. An error correction circuit corrects errors of a signal outputted from said OFDM signal decoding circuit. The low pass filter is a filter capable of varying a frequency characteristic in response to said first sampling rate.

Another embodiment of the invention is a system for receiving an OFDM signal.

An AD converter samples a received signal at a first sampling rate. A low pass filter removes noise from a signal outputted from said AD converter. A rate converter extracts data from a signal outputted from said low pass filter at a second sampling rate. An OFDM signal decoding circuit converts and decodes a signal outputted from said rate converter from a time domain to a frequency domain. An error correction circuit corrects errors of a signal outputted from said OFDM signal decoding circuit. A modulation system detecting circuit detecting a modulation system of said received signal. An operational unit of said AD converter changes the number of sampling bits in response to the modulation system detected in said modulation system detecting circuit.

An embodiment of the present invention is a method for receiving an OFDM signal.

Sampling a received signal at a first sampling rate. Removing selected noise from said signal sampled at said first sampling rate. Extracting data form said signal removed at a second sampling rate. Converting and decoding said signal extracted from a time domain to a frequency domain. Correcting an error of said signal decoded. A frequency characteristic in said removing is variable in response to said first sampling rate.

Another embodiment of the invention is a method for receiving an OFDM signal.

Sampling a received signal at a first sampling rate. Removing selected noise from said signal sampled at said first sampling rate. Extracting data from said signal removed at a second sampling rate. Converting and decoding said signal extracted from a time domain to a frequency domain. Correcting an error of said signal decoding. Detecting a modulation system of said received signal. The number of sampling bits in said sampling is changed in response to said detected modulation system.

DETAILED DESCRIPTION OF THE INVENTION

Hereinafter, description will be made for embodiments of the present invention with reference to the drawings.

(First Embodiment)

Wireless channels in the 5 GHz band, which are for use in the wireless LAN, are set at an interval of 20 MHz on the premise that signals subjected to (OFDM modulation are used therefor. An effective bandwidth per one channel is about 17 MHz, and there is a buffering band of about 3 MHz between one channel and a channel adjacent thereto. Therefore, when using a channel selection filter mounted with an RF or an IF, it is difficult to significantly remove a signal component of the adjacent channel. A base band signal converted from analog to digital and sampled. Then, a low pass filter (hereinafter referred to as "LPF") by digital signal processing is realized, and the signal component of the adjacent channel is removed.

Figure 1:
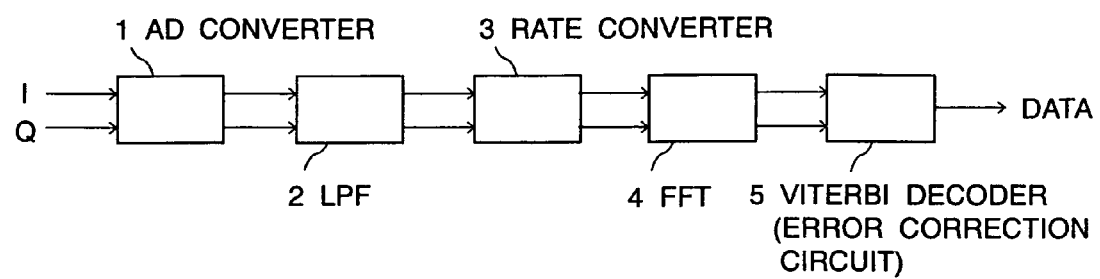
FIG. 1 shows a block diagram of a system for receiving an OFDM signal according to a first embodiment.

FIG. 1 is a block diagram of a system for receiving an OFDM signal according to a first embodiment. The system for receiving an OFDM signal of this embodiment includes an AD converter 1 which samples orthogonal signals of I and Q as digital signals (data) at a first sampling rate, an LPF 2 which removes noise from the data sampled in response to the sampling rate of the AD converter 1, a rate converter 3 which extracts data from the data from which the noise is removed at a second sampling rate, an OFDM signal decoding circuit 4 (hereinafter referred to as "FFT") which converts the data converted at an operationable sampling rate from a time domain to a frequency domain by Fourier conversion, and a Viterbi decoder 5 (error correction circuit) correcting an error. Note that, in each block, there exists a circuit corresponding to each of the orthogonal signals of I and Q.

Figure 2A:
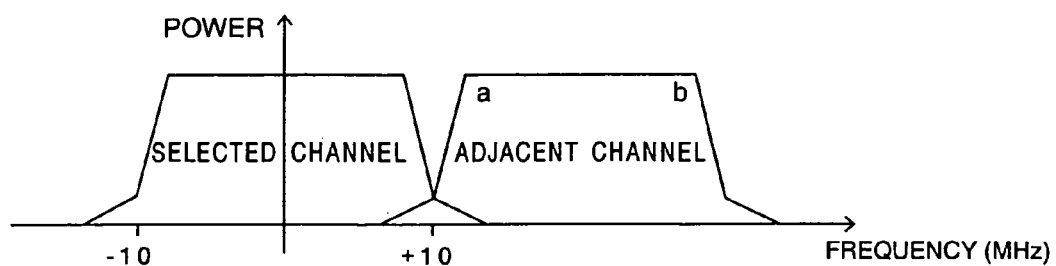
FIGS. 2(a) to 2(d) show views schematically showing bands of channels.
Figure 2B:
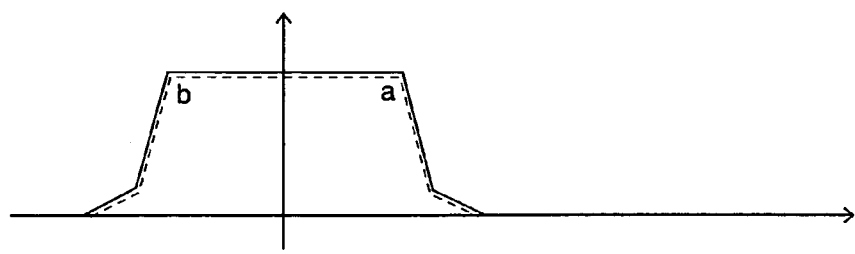
Figure 2C:
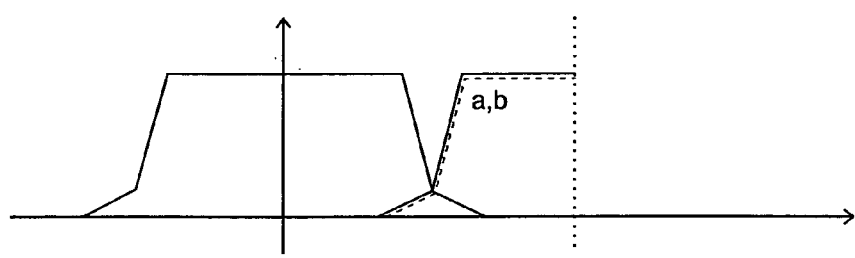
Figure 2D:
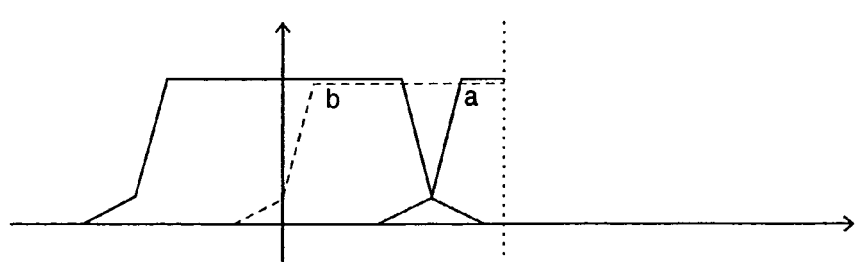

FIGS. 2(a) to 2(d) are views schematically showing bands of channels. Moreover, FIGS. 2(b) to 2(d) are views schematically showing aliasing caused by the sampling in the AD converter 1. Here, as shown in FIG. 2(a), consideration is made for the case of a selected channel and an adjacent channel thereto as noise. When a base band signal is sampled, as indicated by a sampling theorem, a sampling rate that is twice or more the maximum frequency component occupied by the signal may be used. Specifically, in order to sample a signal component having a band of ±8.5 MHz per one channel, a sampling rate of about 20 MSPS may be used.

However, as shown in FIG. 2(b), in the case of using the sampling rate of 20 MSPS, due to an effect of the aliasing (folding), the signal of the adjacent channel is superimposed as noise on the selected channel.

In order to avoid the above, an oversampled signal may be captured at a sampling rate of about 40 MSPS. As shown in FIG. 2(c), in the case of using the sampling rate of 40 MSPS, due to the effect of aliasing, the adjacent channel is folded back with respect to an approximately central frequency thereof, and a signal component superimposed as noise on the selected channel is small.

Figure 3:
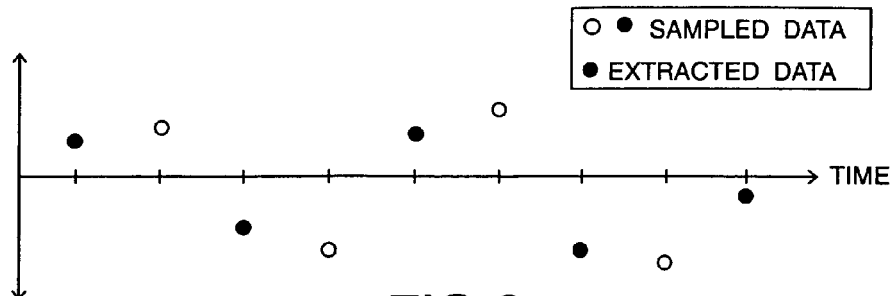
FIG. 3 shows a graph showing sampling data of 40 MSPS on a time axis.

The signal captured at the sampling rate of 40 MSPS in the AD converter 1 is subjected to LPF processing by the digital signal processing in the LPF 2, and thus the signal component of the adjacent channel is removed. Furthermore, in order to process sampling data of 20 MSPS in response to an effective bandwidth of the channel signal in a later step of the FFT 4, data equivalent to 20 MSPS is extracted from the data subjected to the LPF processing by extraction processing in the rate converter 3. FIG. 3 is a graph showing example sampling data of 40 MSPS on a time axis. Circles shown in FIG. 3 denote the sampled data. Among them, black circles denote the data extracted by extraction processing.

In the conventional system for receiving an OFDM signal, the AD converter 1, the LPF 2, and the like sample and process data at an integer multiple rate of 20 MSPS, such as, for example, 40 MSPS.

However, in the AD converter, as the sampling rate is accelerated, the power consumption is increased. Hence, in order to realize a lower power consumption, it is desirable to execute the sampling at a low sampling rate.

Accordingly, this embodiment is made to enable the LPF processing or the extraction processing even in the case where the sampling rate is not necessarily an integer multiple of 20 MSPS, such as, for example, 30 MSPS.

Figure 4:
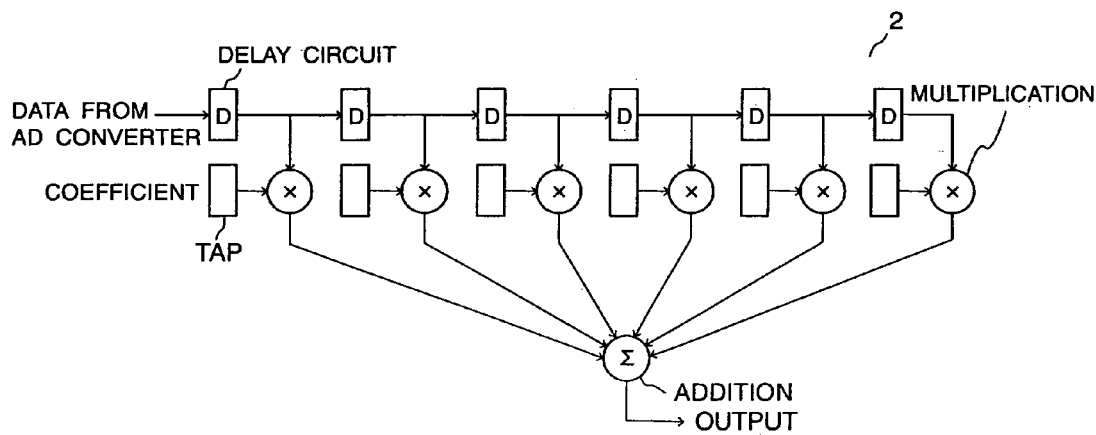
FIG. 4 shows a circuit diagram of an LPF in the first embodiment.

FIG. 4 is a circuit diagram of an LPF in the first embodiment. The LPF is constituted of a finite impulse response (FIR) filter. In this embodiment, a coefficient of each tap is programmable in the FIR filter, and a frequency characteristic of the LPF changes in response to the sampling rate.

For example, data converted into a digital signal at the sampling rate of 30 MSPS in the AD converter 1 is subjected to LPF processing in the LPF having tap coefficients changed in response to the sampling rate of 30 MSPS.

In the LPF processing, the tap coefficients of the FIR filter are changed in response to the sampling rate, and thus a desired frequency characteristic can be obtained. Hence, even if the sampling rate is 30 MSPS, the noise due to the adjacent channel and the like can be removed, and a desired frequency band (the selected channel) can be obtained.

In the case of sampling at 30 MSPS, the effect of aliasing will be as shown in FIG. 2(d). The signal component superimposed as noise is increased as compared with the case of the sampling rate of 40 MSPS. However, a high frequency component of the adjacent channel can be removed in an unillustrated band pass filter (BPF) in a preceding step. Specifically, when the sampling is made in the AD converter 1, the frequency on the portion represented as a noise in FIG. 2(d) is removed. Hence, even at the sampling rate of 30 MSPS, a desired frequency band can be obtained without receiving the effect of the aliasing.

Figure 5A:
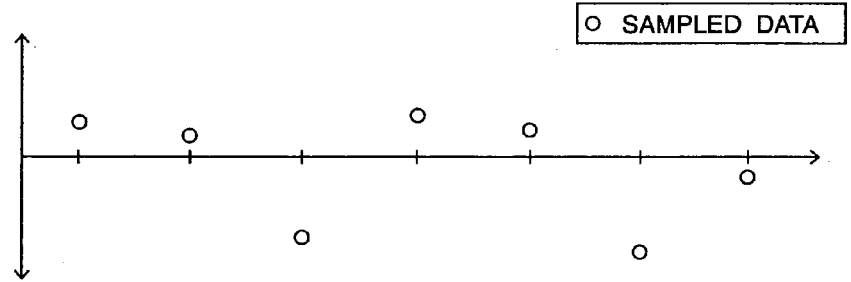
FIG. 5(a) shows a graph showing sampling data of 30 MSPS on a time axis.

Moreover, an interpolation processing circuit is provided, and in the case where there is no sampling data corresponding to an extraction time in the extraction processing for the sampling data, interpolation processing is carried out among the sampling data linearly or by a high-order function. FIG. 5(a) is one example of a graph showing the sampling data of 30 MSPS on a time axis. Circles shown in FIGS. 5(a) and 5(b) denote data sampled in the AD converter 1.

Figure 5B:
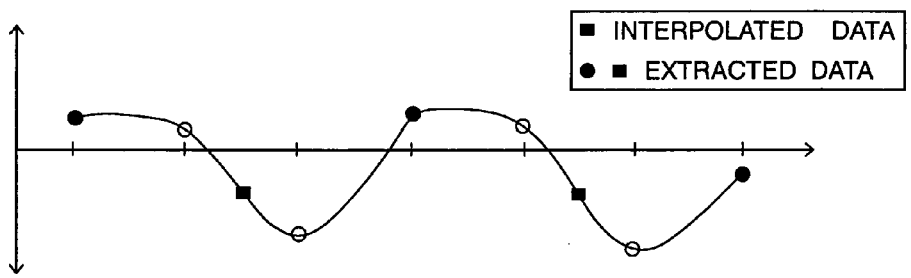
FIG. 5(b) shows a graph showing the sampling data of 30 MSPS and data interpolated on a time axis.

Moreover, FIG. 5(b) is a graph further showing data interpolated in FIG. 5(a). Squares in the drawing denote the data interpolated. By this interpolation processing, the data at a desired extraction time can be extracted. In the drawing, black circles and the squares are the data to be extracted.

Then, the sampling data of 30 MSPS and the sampling data subjected to the interpolation processing are extracted as, for example, the sampling rate of 20 MSPS in the rate converter 3. In the FFT 4, the extracted data is converted from data of a time domain to data of a frequency domain by Fourier conversion. From the data subjected to Fourier conversion, a signal point on an IQ plane for each subcarrier is extracted. Furthermore, the Viterbi decoder 5 corrects errors in the data, and thus the data is decoded.

In this embodiment, the tap coefficients of the LPF are made variable, and thus a desired frequency characteristic can be obtained in accordance with the sampling rate, and the receiving processing according to the OFDM modulation system is enabled. Since the sampling number can be reduced as compared with conventional devices, the power consumption can be reduced. Moreover, since the sampling number is reduced, even in the case where there is no sampling data corresponding to the extraction time, an operation at a low sampling rate is enabled by subjecting the data to the interpolation processing at the extraction time and then the extraction processing. Accordingly, a received signal can be decoded to desired data.

Although description has been made for this embodiment while exemplifying the FIR filter as an LPF, the LPF may be any filter capable of varying the frequency characteristic.

(Second Embodiment)

In the wireless LAN using the OFDM modulation system in the 5 GHz band, there are standards such as IEEE 802.11a, HIPERLAN Type 2, and the like. Moreover, there are seven data transmission rates, including 6, 9, 12, 18, 27, 36 and 54 Mbps, and there are four subcarrier modulation systems, including BPSK, QPSK, 16 QAM and 64 QAM.

In the system for receiving an OFDM signal, the number of bits required for the operation differs depending on the modulation system for each subcarrier. For example, in order to deal with the 64 QAM modulation for use at the time of 54 Mbps as the maximum transmission rate, the AD converter samples 12-bit. Meanwhile, in the BSPK modulation for use at the time of minimum transmission rate of 6 Mbps, 8-bit sampling data is sufficient. Similarly, 10-bit sampling data is sufficient for 16 QAM modulation, and 8-bit sampling data is sufficient for QPSK modulation.

Table 1 shows a relation between the number of bits and the transmission rate in each modulation system.

| Modulation System | Number of Bits | Transmission Rate (Mbps) |
|---|---|---|
| 64 QAM | 12 | 54 |
| 16 QAM | 10 | 27, 36 |
| QPSK | 8 | 12, 18 |
| BPSK | 8 | 6, 9 |

The number of bits required for the operation can be obtained by detecting a modulation system of the received OFDM signal.

Figure 6:
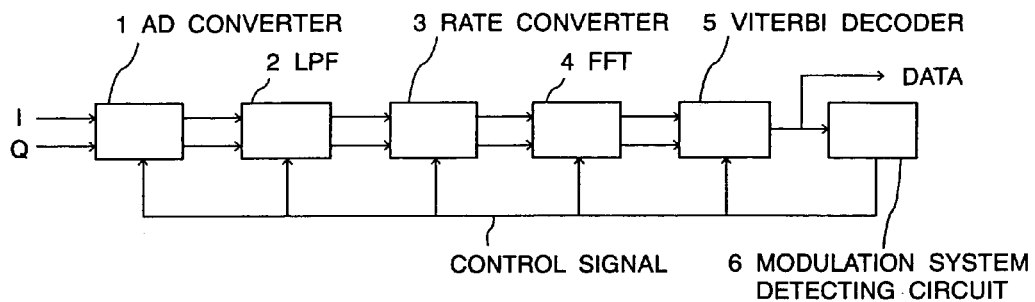
FIG. 6 shows a block diagram of a system for receiving an OFDM signal according to second and third embodiments.

FIG. 6 is a block diagram of the system for receiving an OFDM signal according to the second embodiment. The system for receiving an OFDM signal of this embodiment includes an AD converter 1 which samples orthogonal signals of I and Q as digital signals (data) at a first sampling rate, an LPF 2 which removes noise from the data sampled in response to the sampling rate of the AD converter 1, a rate converter 3 which extracts data from the data from which the noise is removed at a second sampling rate, an OFDM signal decoding circuit 4 (hereinafter referred to as "FFT") which converts the data converted at an operationable sampling rate from a time domain to a frequency domain by Fourier conversion, a Viterbi decoder 5 which corrects errors, and a modulation system detecting circuit 6.

The modulation system detecting circuit 6 in the second embodiment detects a modulation system of a received signal, and changes the number of bits, which is required for each operation.

Next, description will be made for an operation of the system for receiving an OFDM signal in the second embodiment. For example, consideration is made for the case of changing the number of sampling bits in the AD converter 1. The received OFDM signal is sampled in the AD converter 1, and subjected to LPF processing for extracting a channel signal selected in the LPF 2. The rate converter 3 executes extraction processing for the sampling data. Subsequently, the data is converted from a time domain to a frequency domain in the FFT 4, and the converted data is processed in the Viterbi decoder 5 for error correction. Thus, the received data is decoded.

Moreover, with regard to the data in which the error is corrected in the Viterbi decoder 5, the modulation system detecting circuit 6 detects which modulation system is used for transmission. The modulation system is described in a header of a frame. In the modulation system detecting circuit 6, first, the header of the frame is received and analyzed, and then a modulation system of a subsequent data portion is detected. The frame is a unit of communication in a wireless LAN.

Then, in the AD converter 1, the number of sampling bits is changed in the receiving processing for the subsequent data portion depending on the detected modulation system. Thus, the sampling processing is carried out.

Figure 7:
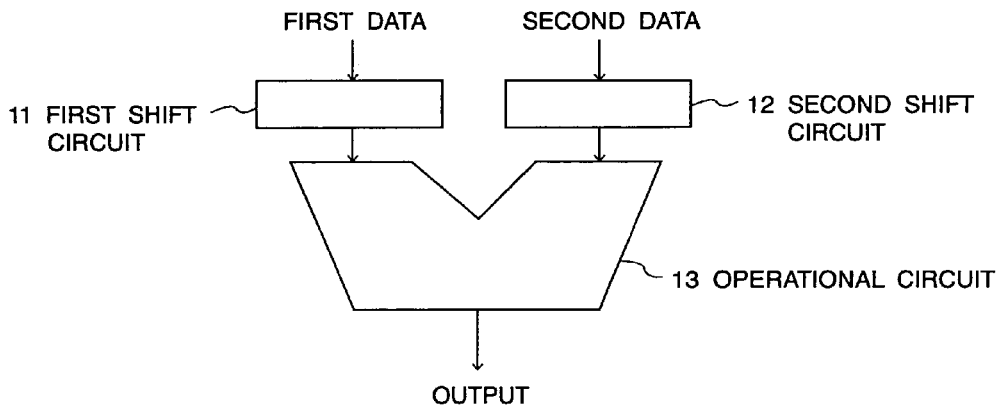
FIG. 7 shows a block diagram of an operational unit in the second embodiment.

FIG. 7 is a block diagram of an operational unit in this embodiment, which is used as an operational unit in the AD converter 1 in FIG. 6. The operational unit of this embodiment comprises a first shift circuit 11, a second shift circuit 12, and an operational circuit 13 operating on data outputted from the first and second shift circuits 11 and 12. In response to the modulation system, the first and second shift circuits 11 and 12 set effective data close to a side of the most significant bit (MSB) and set "0" data close to a side of the least significant bit (LSB).

Here, consideration is made for the case where the modulation system detected in the modulation system detecting circuit 6 is 16 QAM. For example, the operational circuit 13 is assumed to be capable of operating 12-bit data at the maximum. In the case where the modulation system for the OFDM signal is 16 QAM, the number of sampling bits, which is required in the operation of the AD converter, will be 10 bits. In response to the detected modulation system, the first and second shift circuits 11 and 12 set the effective data close to the side of the MSB and the "0" data close to the side of the LSB. In the case of 16 QAM, 2-bit "0" data is set on the side of the LSB.

As described above, if it is possible to reduce the number of bits regarding the signal processing, that is, if it is possible to reduce a domain where the operational unit is activated, then it is possible to reduce the power consumption of the circuit.

Note that, typically, the header of the frame is sent by the BPSK modulation system capable of receiving the header of the frame most stably. Hence, on standby for receiving a new frame and during analysis of the header, the circuit is operated by the number of operational bits, which corresponds to the BPSK modulation system. In such a manner, the power consumption can be further suppressed. Then, the number of operational bits in the operational unit is dynamically varied in response to an analysis result of the header, thus making it possible to reduce the power consumption.

Similarly, operational units in the LPF 2, the rate converter 3, and the OFDM signal decoding circuit 4 can be also constituted to be similar to the operational unit as shown in FIG. 7. For example, an operational unit for use in the interpolation processing, an operational unit for use in the FFT processing, and the like correspond to the unit shown in FIG. 7. In the case of these, similarly to the AD converter 1, the number of operational bits may be changed depending on the modulation system detected in the modulation system detecting circuit 6, alternatively, the number of operational bits may be changed depending on the number of sampling bits of the AD converter 1.

Similarly, the domain where the operational unit is activated can be reduced, thus making it possible to reduce the power consumption.

Moreover, also in the Viterbi decoder 5, in response to the modulation system, in response to the number of sampling bits of the AD converter 1, or in response to a coding ratio of codes in a transmission path, the number of bits in the soft decision may be changed, or the decision may be switched to the hard decision. Thus, a similar effect can be obtained.

Note that, the coding ratio of the codes in the transmission path is changed in response to the transmission rate. Hence, if the transmission rate and the modulation system are known, then switching to the soft decision or the hard decision may be made in the Viterbi decoder 5 in response to the coding ratio.

In this embodiment, the modulation system detecting circuit 6 detects the modulation system, and thus the number of sampling bits in the AD converter and the number of operational bits from the LPF to the Viterbi decoder are changed. In response to the number of bits reduced, a critical path in the operational unit is shortened, and the domain where the operational unit is activated is reduced. Therefore, the power consumption is reduced.

Moreover, since a signal at the slow transmission rate is resistant to noise, decoding thereof is facilitated even at a low sampling rate. Hence, the system may be operated while changing the sampling rate in the AD converter 1 in response to the transmission rate.

As shown in Table 1, the approximate transmission rate can be obtained by detecting the modulation system of the received OFDM signal. Thus, 64 QAM has the highest rate, while 16 QAM, QPSK, and BPSK have progressively lower approximate transmission rate ranges.

(Third Embodiment)

A block diagram of a system for receiving an OFDM signal according to a third embodiment is the same as FIG. 6 shown in the second embodiment. Modulation system detecting circuit 6 in the third embodiment detects a modulation system of a received signal, and in response to the detected modulation system, switches the sampling rate of the AD converter 1. For example, BPSK and QPSK are operated at the sampling rate of 30 MSPS, and 16 QAM and 64 QAM are operated at the sampling rate of 40 MSPS.

In this embodiment, since the sampling rate is switched in response to the transmission rate (modulation system), the modulation system at the slow transmission rate is operated at a low sampling rate, and thus the power consumption can be reduced. Moreover, the modulation system with a rapid transmission rate is operated at a high sampling rate, and thus the signal can be decoded stably without a large noise influence.

With regard to the AD converter 1 in this embodiment, AD converters for different sampling rates, for example, an AD converter for 30 MSPS and an AD converter for 40 MSPS may be constituted separately. Alternatively, one AD converter capable of sampling at 40 MSPS may be used, and the sampling may also he carried out at the sampling rate of 30 MSPS in this AD converter.

Even if the sampling rate is switched in response to the transmission rate, the receiving processing in the OFDM modulation system is enabled by varying the frequency characteristic of the LPF 2 shown in the first embodiment.

Data sampled at 40 MSPS is subjected to LPF processing in the LPF 2 changed in frequency characteristic corresponding to 40 MSPS. Subsequently, sampling data at 20 MSPS is extracted by extraction processing in the rate converter 3. Then, the extracted data is subjected to the processing in the FFT 4 and the Viterbi decoder 5.

Moreover, data sampled at 30 MSPS is subjected to the LPF processing in the LPF 2 changed in frequency characteristic corresponding to 30 MSPS. Subsequently, the data is subjected to interpolation processing and extraction processing at an extraction time in the rate converter 3 Then, the extracted data is subjected to the processing in the FFT 4 and the Viterbi decoder 5.

In this embodiment, the modulation system is detected in the modulation system detecting circuit 6, and thus the sampling rate in the AD converter 1 is changed. The sampling rate is changed in response to the transmission rate corresponding to the modulation system. Therefore, in the case of a slow transmission rate, the sampling rate is lowered, thus making it possible to reduce the power consumption. Moreover, in the case of a rapid transmission rate, the sampling rate is heightened, thus enabling stable decoding.

(Fourth Embodiment)

In the second embodiment, the number of operational bits in each operational unit changes in response to the modulation system. If the number of sampling bits of the data and the number of operational bits necessary for each operational unit are known in response to the modulation system, then generation of carry from the LSB side in an operational unit can be suppressed. Hence, a shortened amount of the critical path can be also known in advance.

Figure 8:
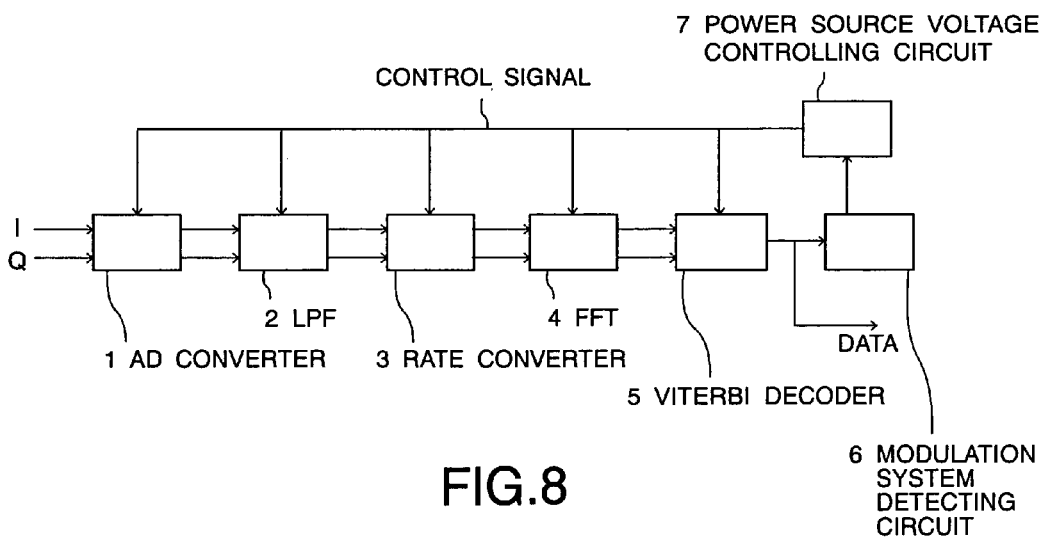
FIG. 8 shows a block diagram of a system for receiving an OFDM signal in a fourth embodiment.

Accordingly, in a fourth embodiment, a power source voltage is controlled in response to the number of operational bits, that is, in response to a level necessary for the critical path to be operated. FIG. 8 is a block diagram of a system for receiving an OFDM signal in the fourth embodiment. The system for receiving an OFDM signal in this embodiment is further composed of a power source voltage controlling circuit 7 controlling a voltage amount of each block in addition to the system for receiving an OFDM signal in the second embodiment shown in FIG. 6.

The power source voltage controlling circuit 7 controls the voltage amount of each block in response to the modulation system detected in the modulation system detecting circuit 6.

Next, description will be made for an operation of the system for receiving an OFDM signal in this embodiment. With regard to the received OFDM signal, data sampled in the AD converter 1 is subjected to LPF processing for extracting a selected channel signal in the LPF 2, and then subjected to extraction processing of the sampling data in the rate converter 3. Subsequently, a signal point for each subcarrier is extracted in the FFT 4, and error correction is made for the data in the Viterbi decoder 5. Thus, the received data is decoded.

Moreover, the modulation system detecting circuit 6 detects which modulation system is used for transmitting the data subjected to error correction in the Viterbi decoder 5. Then, in response to the detected modulation system, the power source voltage controlling circuit 7 adjusts a voltage in each block. Thus, the power source voltage can be lowered to a level sufficient for operating the shortened critical path.

Moreover, since the header of the frame is sent by the BPSK modulation system, the power consumption can be reduced by operating the circuit at the lowest necessary voltage on standby or during analysis of the header.

According to this embodiment, the voltage in each block is controlled in response to the modulation system, and thus the circuit can be operated at the minimum necessary voltage level. Hence, as compared with conventional devices, the power consumption can be reduced.

According to the present invention, the frequency characteristic of the LPF in the system for receiving an OFDM signal is made variable, thus enabling decoding even at a low sampling rate and making it possible to reduce the power consumption. Moreover, the sampling rate in the AD converter, the number of operational bits in each block or the power source voltage supplied to each block is changed in response to the modulation system, thus making it possible to reduce the power consumption.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A system for receiving an OFDM signal, comprising:
   an AD converter configured to sample a received signal at a first sampling rate;
   a low pass filter configured to remove selected noise from a signal outputted from said AD converter;
   a rate converter configured to extract data from a signal outputted from said low pass filter at a second sampling rate;
   an OFDM signal decoding circuit configured to convert and decode a signal outputted from said rate converter from a time domain to a frequency domain; and
   an error correction circuit configured to correct errors of a signal outputted from said OFDM signal decoding circuit,
   wherein said low pass filter is a filter capable of varying a frequency characteristic in response to said first sampling rate.

2. The system for receiving an OFDM signal according to claim 1,
   wherein said low pass filter is an FIR filter.

3. The system for receiving an OFDM signal according to claim 1, further comprising:
   an interpolation processing circuit configured to interpolate data at a desired time in the case where there is no data at the time,
   wherein said rate converter extracts data including said interpolated data at said second sampling rate.

4. The system for receiving an OFDM signal according to claim 3,
   wherein said interpolation processing circuit interpolates said data at said desired time between data sampled in said AD converter by any of a straight line and a high-order function.

5. The system for receiving an OFDM signal according to claim 1, further comprising:
   a modulation system detecting circuit configured to detect a modulation system of said received signal,
   wherein said first sampling rate is changed in response to the modulation system detected in said modulation system detecting circuit.

6. The system for receiving an OFDM signal according to claim 5,
   wherein said first sampling rate is lowered in the case where a transmission rate in said detected modulation system is slow.

7. A system for receiving an OFDM signal, comprising:
   an AD converter configured to sample a received signal at a first sampling rate;
   a low pass filter configured to remove selected noise from a signal outputted from said AD converter;
   a rate converter configured to extract data from a signal outputted from said low pass filter at a second sampling rate;
   an OFDM signal decoding circuit configured to convert and decode a signal outputted from said rate converter from a time domain to a frequency domain;
   an error correction circuit configured to correct errors of a signal outputted from said OFDM signal decoding circuit; and
   a modulation system detecting circuit configured to detect a modulation system of said received signal,
   wherein an operational unit of said AD converter changes the number of sampling bits in response to the modulation system detected in said modulation system detecting circuit.

8. The system for receiving an OFDM signal according to claim 7,
   wherein, in response to said detected modulation system, said operational unit includes:
   a first shift circuit which sets first data close to a side of the most significant bit and sets "0" data close to a side of the least significant bit;
   a second shift circuit which sets second data close to the side of the most significant bit and sets "0" data close to the side of the least significant bit; and
   an operational circuit operating data outputted from said first and second shift circuits.

9. The system for receiving an OFDM signal according to claim 8, further comprising:
   a power source voltage controlling circuit controlling a power source voltage in response to said detected modulation system, wherein the power source voltage is lowered in the case where a critical path of said operational unit is shortened.

10. The system for receiving an OFDM signal according to claim 7,
wherein an operational unit of said low pass filter changes the number of operational bits an response to any of said detected modulation system and said number of sampling bits.

11. The system for receiving an OFDM signal according to claim 10,
wherein, in response to said detected modulation system, said operational unit includes:
a first shift circuit which sets first data close to a side of the most significant bit and sets "0" data close to a side of the least significant bit;
a second shift circuit which sets second data close to the side of the most significant bit and sets "0" data close to the side of the least significant bit; and
an operational circuit operating data outputted from said first and second shift circuits.

12. The system for receiving an OFDM signal according to claim 11, further comprising:
a power source voltage controlling circuit controlling a power source voltage in response to said detected modulation system,
wherein the power source voltage is lowered in the case where a critical path of said operational unit is shortened.

13. The system for receiving an OFDM signal according to claim 7,
wherein an operational unit of said rate converter changes the number of operational bits in response to any of said detected modulation system and said number of sampling bits.

14. The system for receiving an OFOM signal according to claim 13,
wherein, in response to said detected modulation system, said operational unit includes:
a first shift circuit which sets first data close to a side of the most significant bit and sets "0" data close to a side of the least significant bit;
a second shift circuit which sets second data close to the side of the most significant bit and sets "0" data close to the side of the least significant bit; and
an operational circuit operating data outputted from said first and second shift circuits.

15. The system for receiving an OFDM signal according to claim 14, further comprising:
a power source voltage controlling circuit controlling a power source voltage in response to said detected modulation system,
wherein the power source voltage is lowered in the case where a critical path of said operational unit is shortened.

16. The system for receiving an OFDM signal according to claim 7,
wherein an operational unit of said OFDM signal decoding circuit changes the number of operational bits in response to any of said detected modulation system and said number of sampling bits.

17. The system for receiving an OFDM signal according to claim 16,
wherein, in response to said detected modulation system, said operational unit includes:
a first shift circuit which sets first data close to a side of the most significant bit and sets "0" data close to a side of the least significant bit;
a second shift circuit which sets second data close to the side of the most significant bit and sets "0" data close to the side of the least significant bit; and
an operational circuit operating data outputted from said first and second shift circuits.

18. The system for receiving an OFDM signal according to claim 17, further comprising:
a power source voltage controlling circuit controlling a power source voltage in response to said detected modulation system,
wherein the power source voltage is lowered in the case where a critical path of said operational unit is shortened.

19. The system for receiving an OFDM signal according to claim 7,
wherein said error correction circuit changes the number of bits for soft decision, alternatively changes the decision to hard decision in response to any of said detected modulation system and said number of sampling bits.

20. The system for receiving an OFDM signal according to claim 19,
wherein, in response to said detected modulation system, said operational unit includes:
a first shift circuit which sets first data close to a side of the most significant bit and sets "0" data close to a side of the least significant bit;
a second shift circuit which sets second data close to the side of the most significant bit and sets "0" data close to the side of the least significant bit; and
an operational circuit operating data outputted from said first and second shift circuits.

21. The system for receiving an OFDM signal according to claim 20, further comprising:
a power source voltage controlling circuit controlling a power source voltage in response to said detected modulation system,
wherein the power source voltage is lowered in the case where a critical path of said operational unit is shortened.

22. A method for receiving an OFDM signal, comprising:
sampling a received signal at a first sampling rate;
removing selected noise from said signal sampled at said first sampling rate;
extracting data form said signal removed at a second sampling rate;
converting and decoding said signal extracted from a time domain to a frequency domain; and
correcting an error of said signal decoded,
wherein a frequency characteristic in said removing is variable in response to said first sampling rate.

23. A method for receiving an OFDM signal, comprising:
sampling a received signal at a first sampling rate;
removing selected noise from said signal sampled at said first sampling rate;
extracting data from said signal removed at a second sampling rate;
converting and decoding said signal extracted from a time domain to a frequency domain;
correcting an error of said signal decoding; and,
detecting a modulation system of said received signal,
wherein the number of sampling bits in said sampling is changed in response to said detected modulation system.

* * * * *

UNITED STATES PATENT AND TRADEMARK OFFICE
CERTIFICATE OF CORRECTION

PATENT NO. : 7,197,081 B2
APPLICATION NO. : 10/029037
DATED : March 27, 2007
INVENTOR(S) : Saito It is certified that error appears in the above-identified patent and that said Letters Patent is hereby corrected as shown below:

Column 11, line 35, change "OFOM" to --OFDM--.

Column 12, line 45, change "form" to --from--.

Signed and Sealed this

Twenty-sixth Day of June, 2007

JON W. DUDAS
*Director of the United States Patent and Trademark Office*